United States Patent [19]

Davis, Jr.

[11] 3,990,399

[45] Nov. 9, 1976

[54] ANIMAL CAGE

[75] Inventor: Samuel R. Davis, Jr., Federalsburg, Md.

[73] Assignee: IPCO Hospital Supply Corporation, White Plains, N.Y.

[22] Filed: Apr. 3, 1975

[21] Appl. No.: 564,786

[52] U.S. Cl. .................................................. 119/17
[51] Int. Cl.² ........................................... A01K 1/00
[58] Field of Search ............ 119/17, 18, 15; 220/19, 220/4 E, 66

[56] References Cited
UNITED STATES PATENTS

| 3,752,123 | 8/1973 | Classe et al. | 119/17 |
| 3,762,593 | 10/1973 | Beretta | 220/19 |

*Primary Examiner*—Hugh R. Chamblee

[57] ABSTRACT

An animal cage which has a removable spaced rod bottom strong enough for laboratory animals to walk on.

4 Claims, 10 Drawing Figures

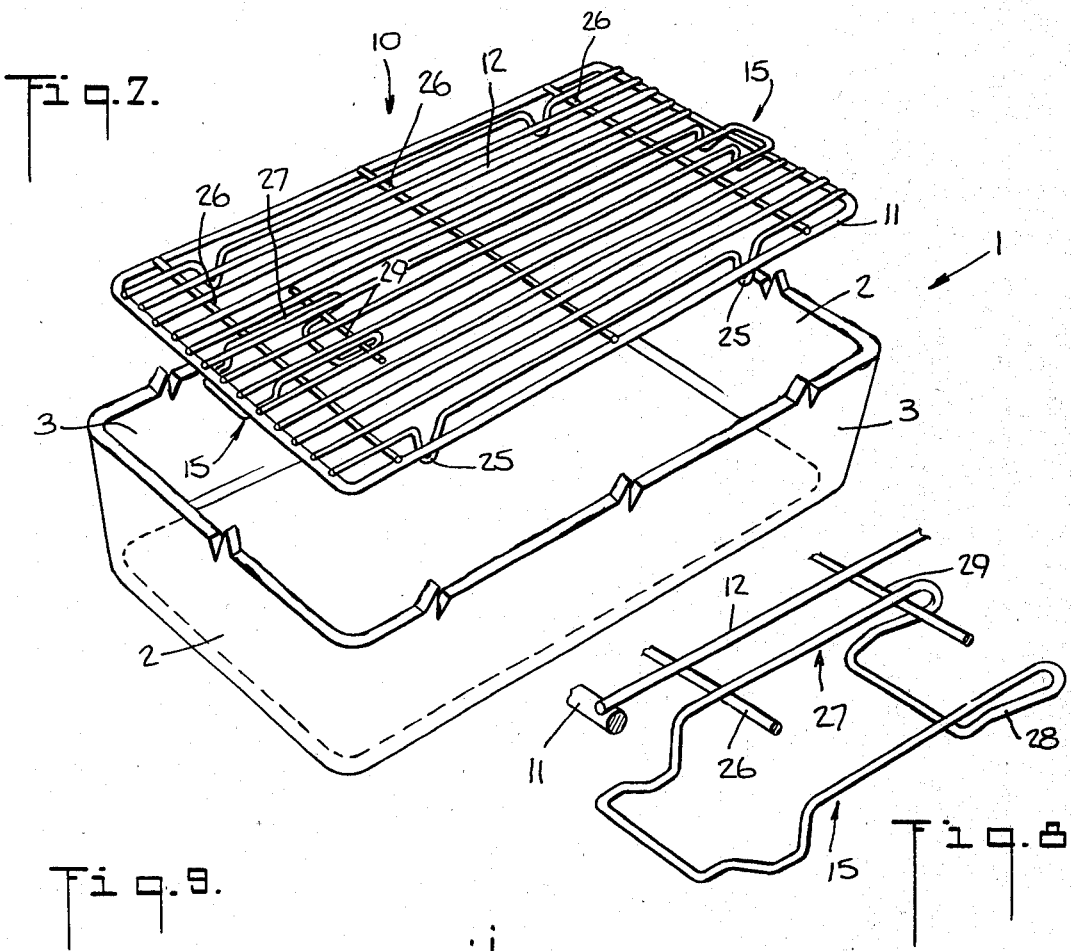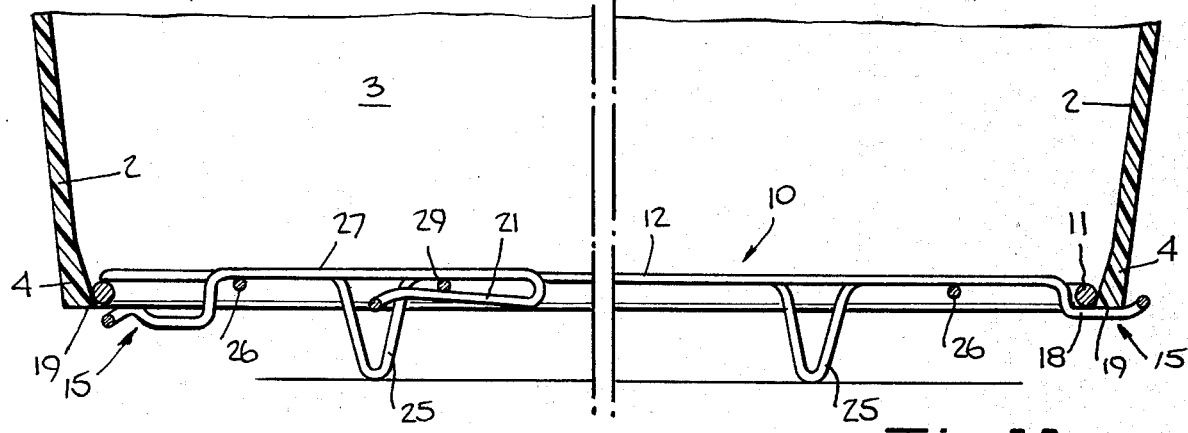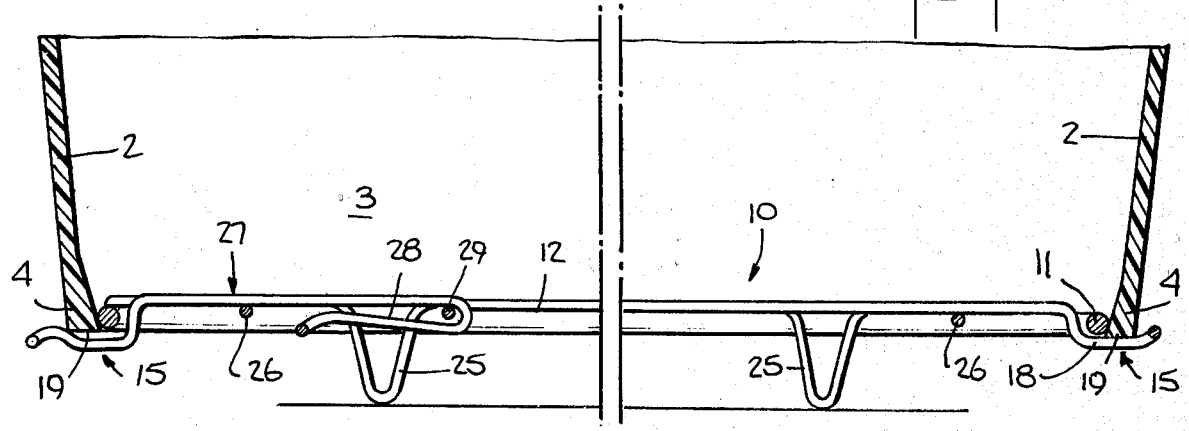

ANIMAL CAGE

DESCRIPTION

The present invention is directed to an improved animal cage and more particularly to an improved animal cage which has a removable bottom wall.

Animal cages usually comprise an upper cage and a lower main body made of a solid transparent material, such as plastic, with integral bottom and side walls made of one piece.

It has been found that such cages frequently become dirty and have to be periodically cleaned. Since the bottoms of the cages are quite deep, cleaning of these cages is a long and involved operation which is time consuming. In addition, the corners of the cages formed by the bottom and the side walls are particularly difficult to clean because of the small spaces involved. Furthermore, such cages are necessarily not in operation while they are being cleaned so that many cages have to be purchased by users.

One solution to this problem has been to form a cage with openings in the bottom such as the cage shown in U.S. Pat. No. 3,397,696. However, in that particular cage, the bottom is quite thick and each opening has vertically extending side walls of the openings combined with the thick bottom would make it even more difficult to clean because there are additional surfaces on which dirt can accumulate.

Furthermore, it is believed that the bottom shown in said patent is permanently mounted in the cage so that the entire cage must be removed from operation until the bottom has been cleaned.

This invention is an improvement over U.S. Pat. No. 3,752,123 dated Aug. 14, 1973 which is directed to a walk-on cage with a snap-on wire mesh lower bottom. The present invention is also an improvement over copending U.S. Pat. application Ser. No. 472,962 filed May 24, 1974 which is also directed to a walk-on cage with a removable bottom.

The present invention has for one of its objects, the provision of an improved animal cage which has an improved bottom which may be easily removed.

Another object of the present invention is the provision of an improved animal cage lid having a removable bottom which may be removed from the cage lid without the use of special tools.

Another object of the present invention is the provision of an improved animal cage in which the bottom is made of a material that cannot be chewed by the animal.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 7 is an exploded sectional view of still another embodiment of the present invention;

FIG. 8 is an enlarged detail showing the locking means for holding the bottom in place;

FIG. 9 is a longitudinal sectional view of the embodiment of FIG. 7 showing the manner in which the bottom is positioned in the cage.

FIG. 10 is a longitudinal sectional view of the embodiment of FIG. 7 showing the position of the bottom in locked position.

Figure 1:
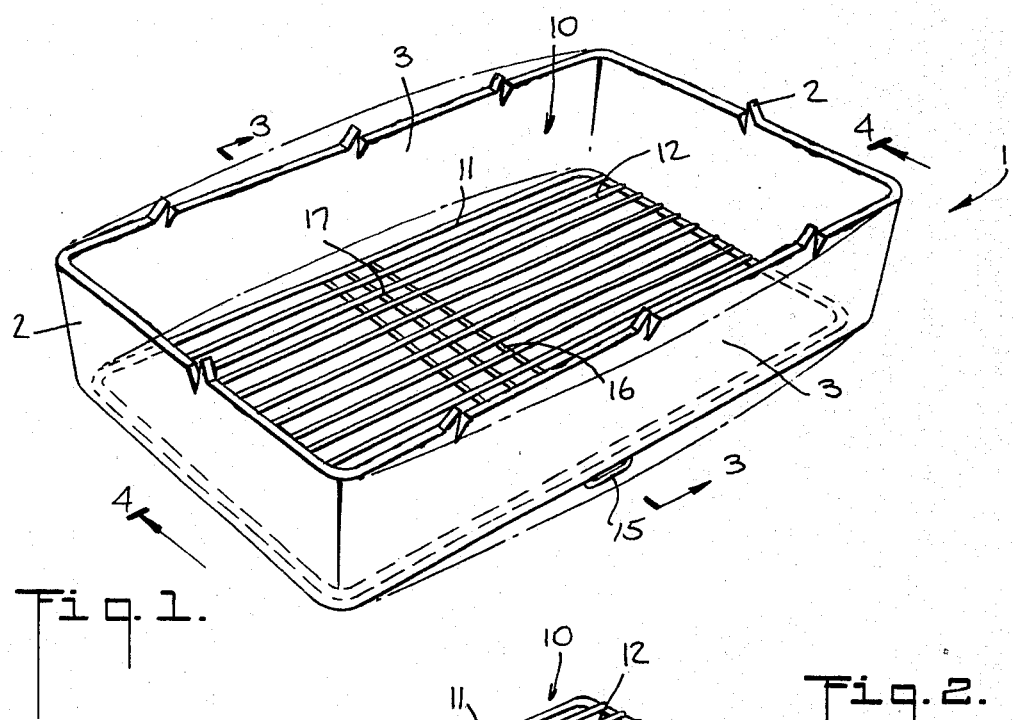
FIG. 1 is a perspective view of an animal cage showing the present invention.
Figure 2:
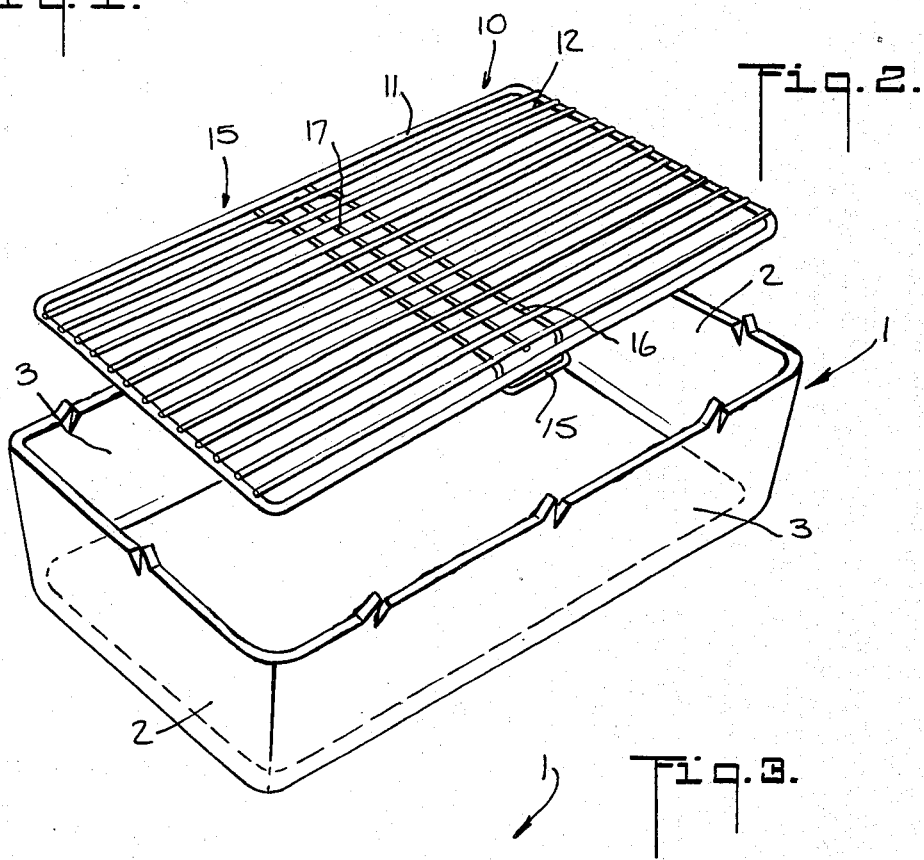
FIG. 2 is an exploded perspective view of the animal cage of the present invention.

Referring more particularly to the drawings, the cage 1 comprises integral side and end walls 2 and 3 respectively, which are preferably made of a plastic material which is preferably transparent. The side and end walls 2 and 3 are shown tapered inwardly in a downward direction, although straight walls may also be used if desired. The walls 2 and 3 terminate at their lower edges to form a bottom opening in the cage to accommodate a removable bottom.

For ease in illustration, the side and end walls 2 and 3 of the cage 1 have been truncated at the top. However, it will be understood that the walls 2 and 3 are deep, as shown in said U.S. Pat. No. 3,752,123 and in said pending application Ser. No. 472,962.

A removable bottom 10 is provided and is made preferably of a metal material stiff enough to permit a laboratory animal to walk thereon.

The bottom 10 comprises a reinforced strengthening outer frame 11 to which are welded, soldered or otherwise mounted a plurality of spaced floor rods 12. The spaces between the rods 12 are wide enough to allow dirt and liquid to flow through but are narrow enough to prevent the animal's foot from falling through.

The rods 12 are preferably made of small round metal gauge material and do not have any appreciable depth so that accumulation of dirt is kept at a minimum. The bulk of the dirt will fall through the spaces in the rods.

Clip lock means or fingers in the form of bent wires 15 are welded, soldered or otherwise mounted to and extend from the opposite sides of the frame 11. Opposed clip lock means 15 are shown as being integral with each other by being formed from a single rod 16 transversely mounted to the bottom 10. A reinforcing rod 17 is also provided to strengthen the construction.

Figure 3:
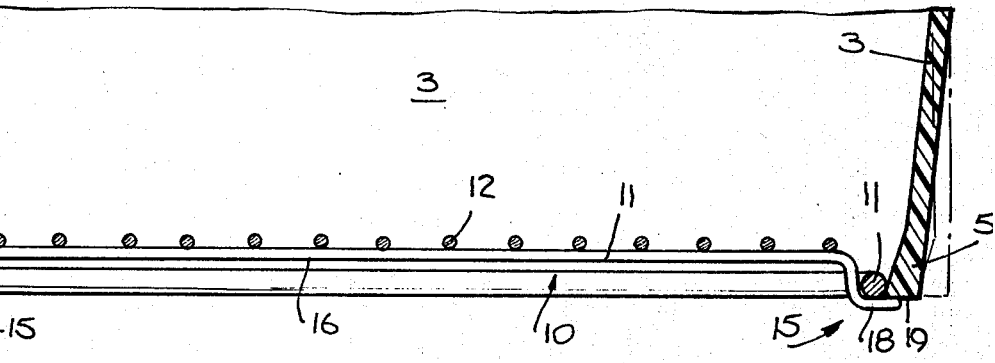
FIG. 3 is a sectional view taken along line 3—3 of FIG. 1.
Figure 4:
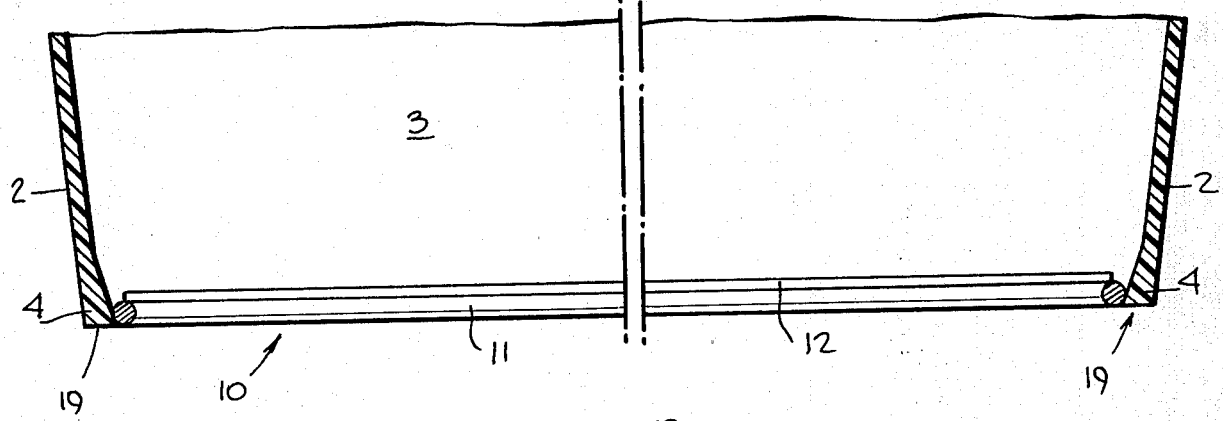
FIG. 4 is a sectional view taken along line 4—4 of FIG. 1.

It will be noted that the clips 15 have a substantially flat body rigid portion 18 which is on a plane below and substantially parallel to the plane of the frame 11. The frame 11 rests on the flat body portion 18 and is in direct contact with it. Referring to FIGS. 3 and 4 it will be noted that the lower areas 4 and 5 of the walls 2 and 3, respectively, are thickened in the form of an inward taper. The lower edges 19 of the walls 2 and 3 are flat and in a plane substantially parallel to the plane of the flat body portion of clips 15.

With this construction, it will be seen that the locking fingers 18 can snap underneath the flat edges 19 of the cage walls 2 and 3. The walls are preferably of such resiliency that they can be bulged slightly outwardly (as shown in broken lines in FIGS. 1 and 3) to permit the fingers to bypass the thickened bottom portion 5 and positioned beneath the flat edges 19. The flat body portion 18 lies against the lower edges 19 and frame 11 is held against the lower tapered portions 4 and 5. This flange 4 and 5 is large enough to support the bottom in place even with the weight of an animal thereon but is not so large as to cause any appreciable accumulation of dirt.

When it is desired to remove the cage bottom, all that is necessary is to flex the side walls 3 outwardly as shown in dotted lines in FIG. 3 so as to release the fingers 18 from the bottom 19 of the animal cage and cause the bottom 10 can be removed.

Figure 5:
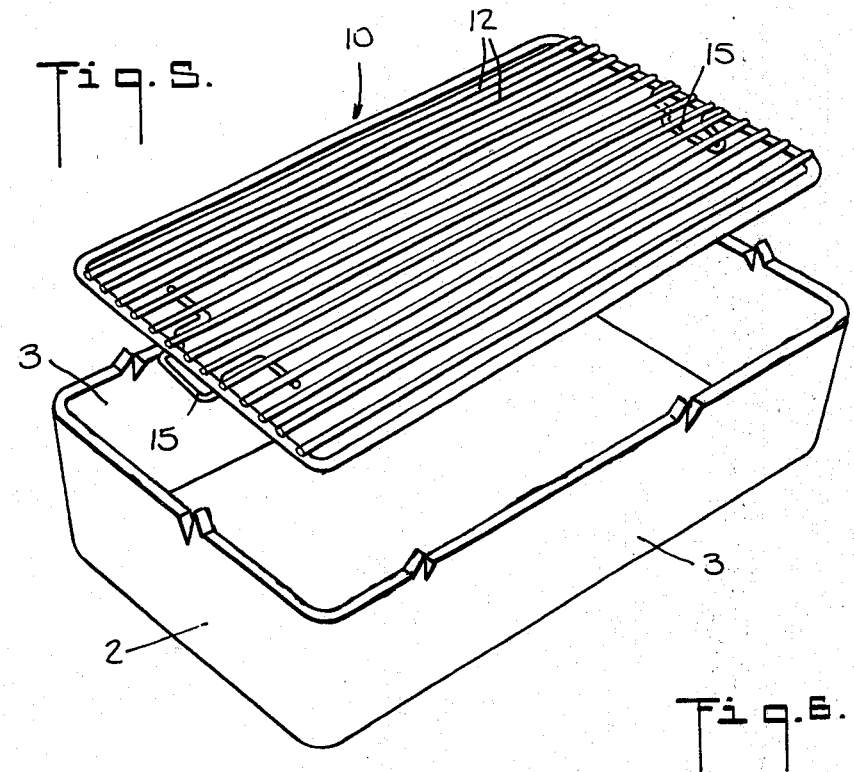
FIG. 5 is an exploded perspective view of another embodiment of the present invention.
Figure 6:
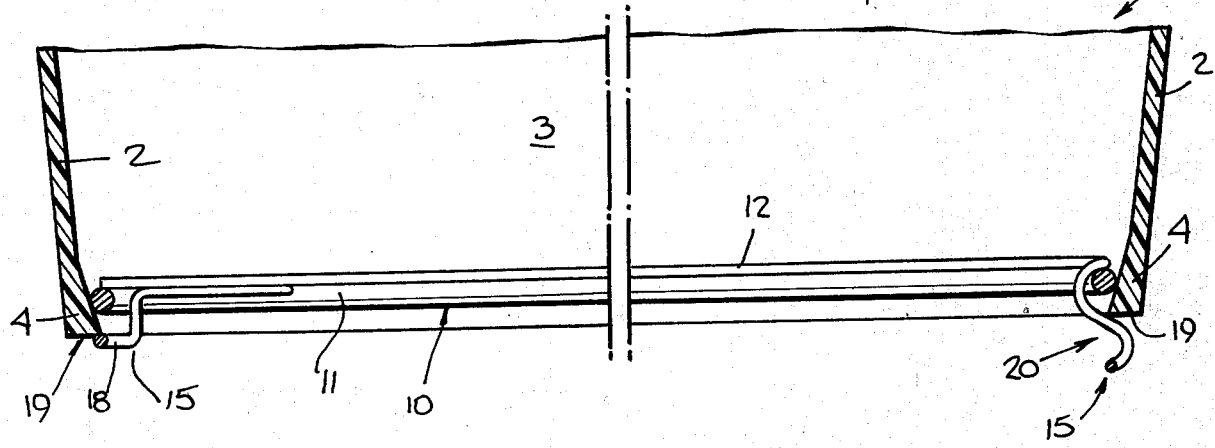
FIG. 6 is a longitudinal sectional view showing the embodiment of FIG. 5 with the walk-on bottom in place.

FIGS. 5 and 6 show another embodiment of the present invention. In all respects, the cage 1 and the removable bottom 10 are similar to the cage and bottom shown and the embodiments of FIGS. 1 and 4. However, the clip lock means or fingers 15 that hold the bottom in place in this particular embodiment are different than the fingers of the embodiment in FIGS. 1 to 4. Extending from one end edge of the bottom as shown in FIGS. 5 and 6, the clip finger 15 is similar to the rigid fingers 15 of the embodiment of FIGS. 1 to 4 with flat body portion 18 and is attached to underline the flat edge 19 of the cage, as shown in FIG. 6. However, the opposite finger 20 has a curved body which is adapted to be snapped under the edge 19 so that when the cage is to be removed, it is merely necessary to snap the finger 20 back to remove the bottom 10.

FIGS. 7 to 10 show another embodiment of the invention. In this embodiment of the bottom 10 is provided with feet 25 to permit the cage 1 to remain elevated from the floor. Preferably the feet 25 comprise spaced portions of rods 12 bent downwardly. The bottom 10 is also provided with transverse spaced reinforcing rods 26.

A modification has been made in the clip locks or fingers 15. The finger 15 at one end edge is similar to the rigid fingers 15 in FIGS. 1 to 4. However, on the opposite edge, the clip lock finger unit 15 comprises a clip body 27 having a guide 28 spaced downwardly from clip body 27 and beneath guide wire 29. Preferably, the clip 27 is integral with the guide 28. The clip body 27 is movable relative the bottom 10 so that, as shown in FIG. 8, the clip body 27 is retracted to permit the bottom 10 to be removed. However, as shown in FIG. 9, the clip 27 is extended so that body 15 underlies the lower edge of the wall 2.

It will be observed that with the present invention, the cage can be washed by easily removing the bottom without the use of special tools. In addition, the cage may be washed by spraying a washing solution through the open bottom in which event it may not be necessary to even remove the bottom.

It will thus be seen that the present invention provides an improved cage in which the bottom is made of a metal type construction which will not accumulate dirt, which is easily removed for cleaning purposes without the necessity of special tools and which the bottom is preferably made of a material that cannot be chewed by the animal.

As many and varied modifications of the subject matter of this invention will become apparent to those skilled in the art from the detailed description given hereinabove, it will be understood that the present invention is limited only as provided in the claims appended hereto.

Having thus described my invention, I claim:

1. An animal cage comprising a plurality of walls, the lower edge of said walls being thickened, a bottom removably mounted within the cage and resting on the thickened edge, said bottom comprising a frame, a plurality of clip fingers extending from the frame adapted to underlie the edge of the walls of the cage, said fingers having a body portion below the plane of the frame, said frame being mounted adjacent said body portion of each clip finger, one of said fingers comprising a clip movable relative to the bottom from a position beneath a wall to a position removed from the wall, said clip comprising a body portion and a guide portion beneath a guide wire and said body portion and said guide portion being integral with each other and comprises a single wire.

2. An animal cage as claimed in claim 1 wherein said bottom is provided with downwardly extending feet formed by depressions in some of the rods forming the bottom.

3. A bottom for an animal cage having a plurality of walls, said bottom comprising a frame, a plurality of clip fingers extending from the frame adapted to underlie the edge of the walls of a cage, said fingers having a body portion below the plane of the frame, said frame being mounted adjacent the body portion of each clip finger, one of said fingers comprising a clip movable relative to the bottom from a position beneath a wall to a position removed from the wall, said clip comprising a body portion and a guide portion beneath a guide wire and said body portion and said guide portion being integral with each other and comprises a single wire.

4. A bottom as claimed in claim 3 wherein said bottom is provided with downwardly extending feet formed by depressions in some of the rods forming the bottom.

* * * * *